US012462777B1

(12) United States Patent
Lee

(10) Patent No.: US 12,462,777 B1
(45) Date of Patent: Nov. 4, 2025

(54) SUPPORT GARMENT FOR A STRINGED MUSICAL INSTRUMENT

(71) Applicant: Thomas Lee, Waynesville, GA (US)

(72) Inventor: Thomas Lee, Waynesville, GA (US)

( * ) Notice: Subject to any disclaimer, the term of this patent is extended or adjusted under 35 U.S.C. 154(b) by 0 days.

(21) Appl. No.: 18/737,412

(22) Filed: Jun. 7, 2024

Related U.S. Application Data

(63) Continuation-in-part of application No. 29/945,926, filed on Jun. 5, 2024, now Pat. No. Des. 1,046,383.

(51) Int. Cl.
*G10G 5/00* (2006.01)
*A41D 1/04* (2006.01)

(52) U.S. Cl.
CPC ............... *G10G 5/005* (2013.01); *A41D 1/04* (2013.01); *A41D 2200/10* (2013.01); *A41D 2400/48* (2013.01)

(58) Field of Classification Search
CPC ...... G10G 5/005; A41D 2200/10; A41D 1/04; A41D 2400/48; A41F 9/002; A41F 15/007; A41F 15/02; A41F 3/04; A41F 3/02; A41F 3/00
See application file for complete search history.

(56) References Cited

U.S. PATENT DOCUMENTS 703,751 A * 7/1902 Adams ..................... A41D 1/04 2/117
831,172 A * 9/1906 Loney ...................... A41D 1/04 2/117
894,365 A * 7/1908 Bustanoby ................ A41F 3/00 2/310
902,084 A * 10/1908 Hylten-Cavallius ..... A41D 1/04 2/229
1,118,572 A * 11/1914 Nigh ........................ A41D 1/04 2/119
1,198,714 A * 9/1916 Feltz ....................... A41F 15/02 24/DIG. 43

(Continued)

FOREIGN PATENT DOCUMENTS

EP 2931079 B1 9/2020
GB 2241152 A * 8/1991 ............... A41D 3/04

OTHER PUBLICATIONS

Hip Strap Waist Guitar or Bass Strap, retrieved from the internet, retrieved on Jun. 5, 2024; <URL: https://slingerstraps.com/products/hip-strap-guitar-strap>.

*Primary Examiner* — Alissa L Hoey

(57) ABSTRACT

A support garment for a stringed musical instrument is an apparatus that provides more comfort to a musical instrument player by better distributing the load of the instrument on the player's body. The apparatus includes an upper-body garment, a first support strap, a second support strap, and a waist belt. The upper-body garment is worn by the player while playing the instrument. The first support strap and the second support strap allow for the removable attachment of the instrument to the apparatus. The first support strap and the second support strap support the instrument in such a way that the instrument is properly supported by the apparatus without obstructing the player's movements while playing the instrument. The waist belt improves the distribution of the load from the instrument on the player's body by helping secure the first support strap and the second support strap to the upper body garment.

18 Claims, 9 Drawing Sheets

(56) References Cited

U.S. PATENT DOCUMENTS

| | | | | | |
|---|---|---|---|---|---|
| 1,208,193 | A * | 12/1916 | Nightingale | A41D 1/04 | 2/275 |
| 1,258,945 | A * | 3/1918 | Rohrberg | A41F 9/002 | 2/338 |
| 1,335,927 | A * | 4/1920 | Ainsworth | A41F 3/00 | 2/310 |
| 1,631,694 | A * | 6/1927 | Rick | A45F 3/12 | 224/264 |
| 1,787,216 | A * | 12/1930 | Spielberger | A41D 1/04 | 2/102 |
| 1,823,369 | A * | 9/1931 | Mcculloch | A41F 3/02 | 2/328 |
| 1,902,939 | A * | 3/1933 | Adler | A41D 1/04 | 2/97 |
| 1,924,295 | A * | 8/1933 | Stiffson | A41F 11/02 | 2/305 |
| 2,030,791 | A * | 2/1936 | Hickok | A41F 3/00 | 2/326 |
| 2,062,833 | A * | 12/1936 | Schiller | A41F 3/00 | 2/333 |
| 2,149,803 | A * | 3/1939 | Wight | A62B 35/00 | 224/259 |
| 2,476,712 | A * | 7/1949 | Eisenberg | A41F 15/02 | 2/268 |
| 2,643,803 | A * | 6/1953 | Bates | A45F 5/00 | 119/857 |
| 2,682,669 | A * | 7/1954 | Valentine | A41F 3/00 | 2/310 |
| 2,688,752 | A * | 9/1954 | Sbarra | A41B 9/00 | 2/310 |
| 3,089,143 | A * | 5/1963 | Jacobson | A62B 35/0031 | 2/310 |
| 3,357,613 | A * | 12/1967 | Chase | A45F 3/14 | 24/369 |
| 3,401,857 | A * | 9/1968 | Wilson | A45F 5/00 | 224/907 |
| 4,040,147 | A * | 8/1977 | King | A45F 5/02 | 224/264 |
| 4,320,863 | A * | 3/1982 | Lyer | A45F 5/00 | 224/259 |
| 4,461,411 | A * | 7/1984 | Harrow | F16M 11/041 | 224/908 |
| 4,795,400 | A * | 1/1989 | Greenberg | A41F 15/007 | 2/268 |
| 4,825,471 | A * | 5/1989 | Jennings | A41D 27/20 | 2/247 |
| 4,923,105 | A * | 5/1990 | Snyder | A45F 5/02 | 224/255 |
| 5,016,797 | A * | 5/1991 | Rowledge | A45F 5/00 | 224/907 |
| 5,036,549 | A * | 8/1991 | Jackson | A41F 3/00 | 2/326 |
| 5,064,108 | A * | 11/1991 | Headley | F21V 23/00 | 224/663 |
| 5,129,105 | A * | 7/1992 | Kleinman | A41F 3/00 | 2/329 |
| 5,215,239 | A * | 6/1993 | Walters, Jr. | G10G 5/005 | 224/259 |
| D348,153 | S * | 6/1994 | Eldridge | D29/101.1 | |
| 5,332,137 | A * | 7/1994 | Violette | G10G 5/005 | 224/264 |
| 5,353,977 | A * | 10/1994 | Schiro, Jr. | A45B 11/02 | 224/189 |
| 5,413,262 | A * | 5/1995 | Dewire | A41F 9/002 | 224/675 |
| 5,440,761 | A * | 8/1995 | Abrams | A45F 5/00 | 224/648 |
| 5,682,619 | A * | 11/1997 | Griffin | A41F 3/00 | 2/326 |
| 5,738,046 | A * | 4/1998 | Williams | A41D 13/0007 | 119/770 |
| 5,758,363 | A * | 6/1998 | Winfree | A41D 13/0015 | 2/108 |
| 5,806,087 | A * | 9/1998 | Grotefend | A41F 9/005 | 2/311 |
| 5,909,802 | A * | 6/1999 | Puco | A45F 3/04 | 224/148.1 |
| 5,915,606 | A * | 6/1999 | Jensen | B44D 3/14 | 224/259 |
| 5,970,526 | A * | 10/1999 | Weathers | A41F 9/002 | 2/920 |
| 5,987,644 | A * | 11/1999 | Mengato | A41D 1/04 | 2/69 |
| 6,167,573 | B1 * | 1/2001 | Lewis | A41F 3/00 | 2/326 |
| D475,177 | S * | 6/2003 | Bratton | D2/829 | |
| 7,009,097 | B1 | 3/2006 | Terplivetz | | |
| 7,147,538 | B2 * | 12/2006 | Cano | A41F 15/007 | 224/264 |
| 7,371,951 | B1 * | 5/2008 | Brunzetti | A41D 13/0007 | 84/327 |
| 7,387,225 | B2 * | 6/2008 | Fox | A45F 5/02 | 224/259 |
| 7,707,652 | B2 * | 5/2010 | Senegal | A63B 23/047 | 2/102 |
| 7,709,714 | B2 * | 5/2010 | Harbaugh | G10G 5/005 | 224/264 |
| 7,891,023 | B1 * | 2/2011 | Hill | A41F 3/00 | 2/310 |
| 8,035,019 | B2 * | 10/2011 | Cadd | G10D 3/18 | 84/453 |
| 8,209,779 | B2 * | 7/2012 | Herman | A41F 3/00 | 2/326 |
| 8,237,036 | B2 * | 8/2012 | Naylor | G10G 5/005 | 84/327 |
| 8,393,016 | B2 * | 3/2013 | Wilkins-Gaudio | A41F 9/002 | 2/338 |
| 8,555,421 | B2 * | 10/2013 | Herman | A41F 13/00 | 2/326 |
| 8,975,498 | B2 * | 3/2015 | Mullins | G10G 5/005 | 84/327 |
| 9,093,054 | B2 * | 7/2015 | Werges | G10G 5/005 | |
| 9,392,860 | B2 * | 7/2016 | Redli | A41D 13/0155 | |
| 9,414,705 | B2 * | 8/2016 | Sclafani | A47G 25/90 | |
| 9,502,015 | B1 * | 11/2016 | Coglitore | G10G 5/005 | |
| 9,530,394 | B1 * | 12/2016 | Corcorran | G10D 3/173 | |
| 10,714,064 | B1 * | 7/2020 | Hafner | G10G 5/005 | |
| 11,077,822 | B2 * | 8/2021 | Macaluso | B60R 22/14 | |
| 11,364,980 | B2 * | 6/2022 | Cohen | A41D 1/04 | |
| D1,046,383 | S * | 10/2024 | Lee | D2/830 | |
| 2004/0144816 | A1 * | 7/2004 | Ku | A45F 3/12 | 224/264 |
| 2004/0221374 | A1 * | 11/2004 | Baacke | A41F 19/00 | 2/300 |
| 2006/0185056 | A1 * | 8/2006 | Zwick | A41D 13/0007 | 2/115 |
| 2007/0192940 | A1 * | 8/2007 | Waters | A41F 3/00 | 2/326 |
| 2007/0289430 | A1 | 12/2007 | Gallagher | | |
| 2008/0136246 | A1 * | 6/2008 | Salter | A47D 13/086 | 297/485 |
| 2009/0325464 | A1 * | 12/2009 | Dekoster | A41F 15/02 | 450/86 |
| 2011/0167540 | A1 * | 7/2011 | Little | A41F 9/002 | 2/338 |
| 2011/0203441 | A1 | 8/2011 | Naylor | | |
| 2011/0214212 | A1 * | 9/2011 | Marx | A41D 13/0007 | 2/2.5 |
| 2012/0012630 | A1 * | 1/2012 | Lui | A41F 9/002 | 224/660 |
| 2013/0047312 | A1 * | 2/2013 | Wilson | A41D 13/0012 | 2/69 |
| 2014/0251113 | A1 * | 9/2014 | Bottrell, Jr. | G10G 5/005 | 84/327 |
| 2015/0230530 | A1 * | 8/2015 | Choi | A41B 1/00 | 2/117 |

(56) References Cited

U.S. PATENT DOCUMENTS

| | | | | |
|---|---|---|---|---|
| 2019/0298565 | A1 * | 10/2019 | Jacobs | A41D 27/20 |
| 2023/0306936 | A1 * | 9/2023 | Helm | G10G 5/005 |
| 2024/0138499 | A1 * | 5/2024 | Barkshire | A41D 27/085 |

* cited by examiner

SUPPORT GARMENT FOR A STRINGED MUSICAL INSTRUMENT

The current application is a continuation-in-part (CIP) application of the U.S. design application Ser. No. 29/945, 926 filed on Jun. 5, 2024.

FIELD OF THE INVENTION

The present invention relates generally to clothing and musical instruments. More specifically, the present invention discloses a piece of clothing designed to be worn by an instrument player to support the musical instrument being played.

BACKGROUND OF THE INVENTION

Several stringed musical instrument accessories have been made available to help the user play the stringed musical instrument more comfortably. For example, guitar straps are some of the most widely used accessories that allow the user to play the guitar more comfortably by distributing the load from the weight of the guitar on the user's shoulder and back. Most guitar straps are provided as single straps that are worn across the upper body by resting on one shoulder. This allows the tethered guitar to be supported by the user's back and shoulder, which frees the user's hands to play the guitar. However, guitars can weigh up to 35 pounds and over many years of playing, nerves become damaged in the neck/shoulder area from the strain of holding a guitar and playing for hours at a time. This causes severe pain and discomfort for the user and can shorten the user's overall guitar playing career. There is a need for a better alternative to help the user play a guitar while lessening the strain of holding the guitar on the user's body.

Therefore, an objective of the present invention is to provide a support garment for a stringed musical instrument that reduces the strain of playing a guitar on the user's body. The present invention implements a smart and economical design to evenly distribute the weight of the musical instrument on the user's body to prevent strain, discomfort, and pain for the players. The present invention utilizes both user's shoulders to equally distribute the weight of the musical instrument on the user's back to promote overall shoulder, neck, and back comfort and better health for the user for years to come. In addition, the present invention is preferably designed for guitars and similar stringed musical instruments. However, the present invention can be modified to be utilized with different musical instruments. Additional features and benefits of the present invention are further discussed in the sections below.

SUMMARY OF THE INVENTION

The present invention discloses a support garment for a stringed musical instrument. The present invention utilizes an upper-body garment with integrated guitar straps positioned around both shoulders to evenly distribute the weight of the guitar on the user's back. The upper-body garment is preferably a vest that can be made of leather, cotton, denim, or similar fabrics. However, different upper-body garments made of different materials can be utilized for the present invention. Further, the guitar straps are length-adjustable and can come in multiple widths and fabrics. On the front of the upper-body garment, each guitar strap can be attached to the top or bottom of the guitar, depending on the user's preference. On the back of the upper-body garment, the guitar straps crisscross atop the vest for better comfort and each strap is then attached to a waist belt that is connected to the backside of the upper-body garment.

Further, the guitar straps are attached to the waist belt via snap fasteners or other appropriate fasteners. The waist belt can also be attached to the upper-body garment using similar snap fasteners so that the waist belt can be removed if desired by the user. As a result, the overall design of the present invention keeps the weight of the guitar from shifting forward while in use. In addition, the adjustability of the present invention can accommodate different body types/sizes of guitar players without the need of replacing the guitar straps. Further, the present invention is customizable so that a wide variety of fabrics, patterns, and closure styles can be implemented to fully capture the preferences of all guitar players in the market. In other embodiments, the present invention can be modified to accommodate different musical instruments.

DETAILED DESCRIPTION OF THE INVENTION

Figure 1:
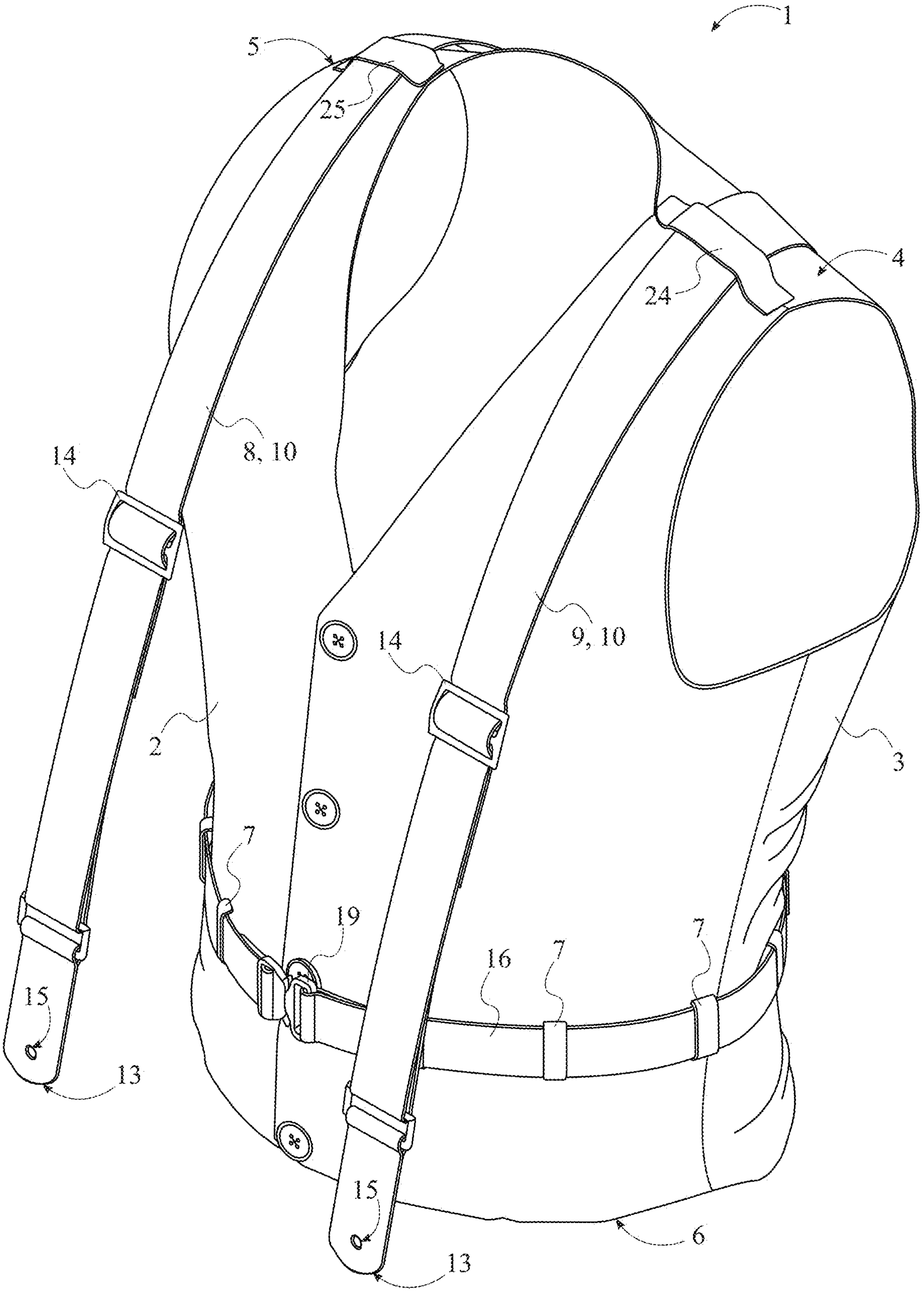
FIG. 1 is a top front perspective view of the present invention.
Figure 2:
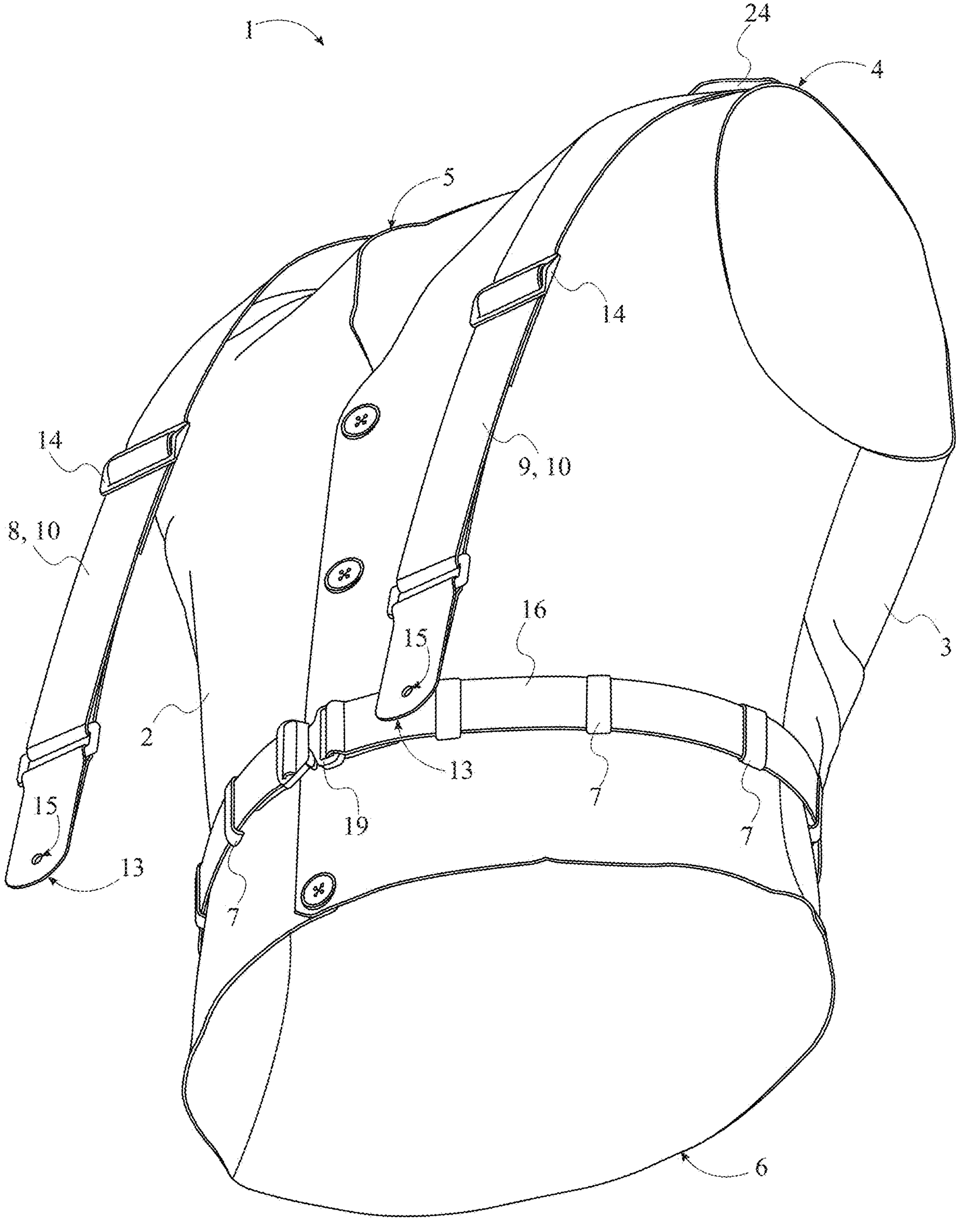
FIG. 2 is a bottom front perspective view of the present invention.
Figure 3:
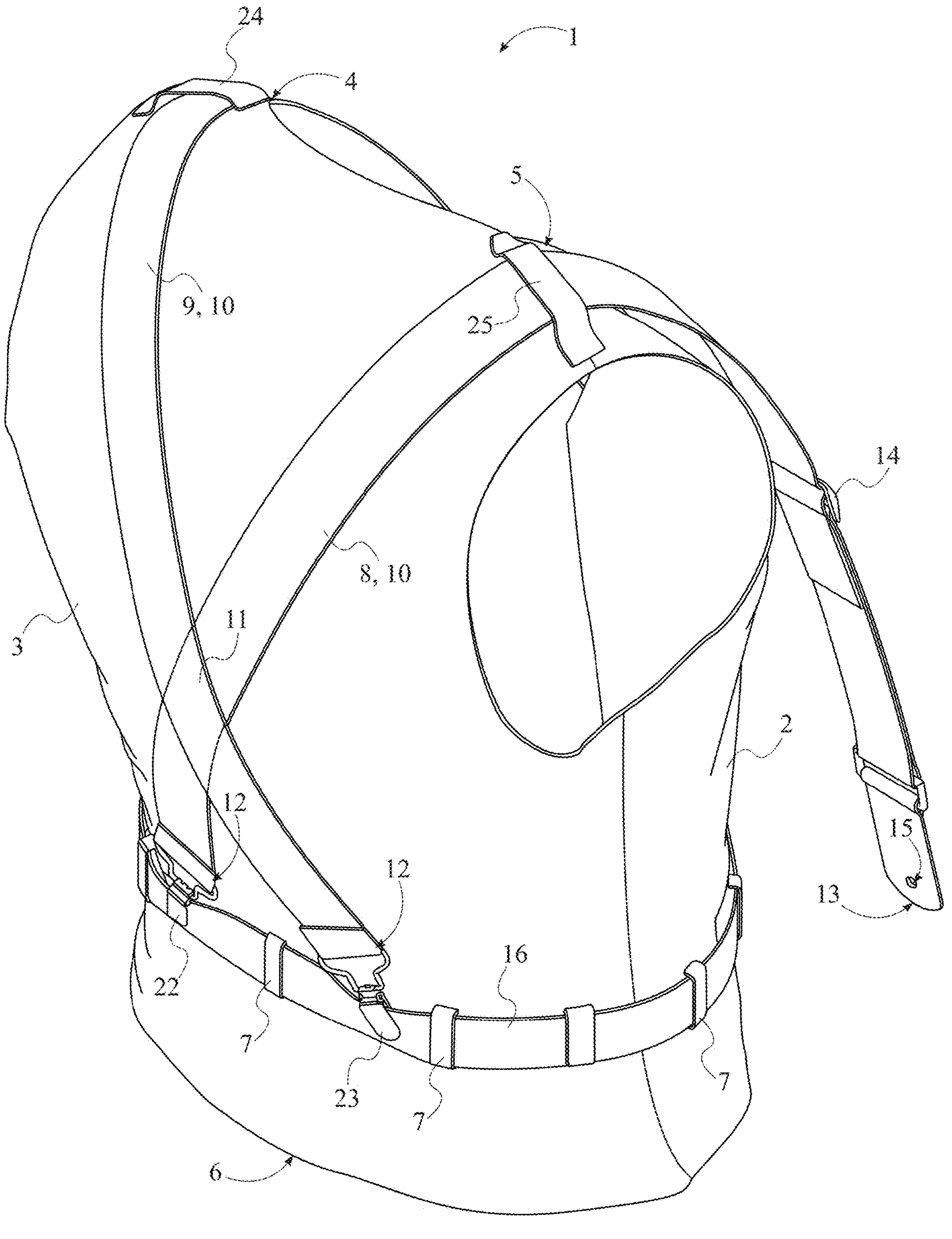
FIG. 3 is a top rear perspective view of the present invention.
Figure 4:
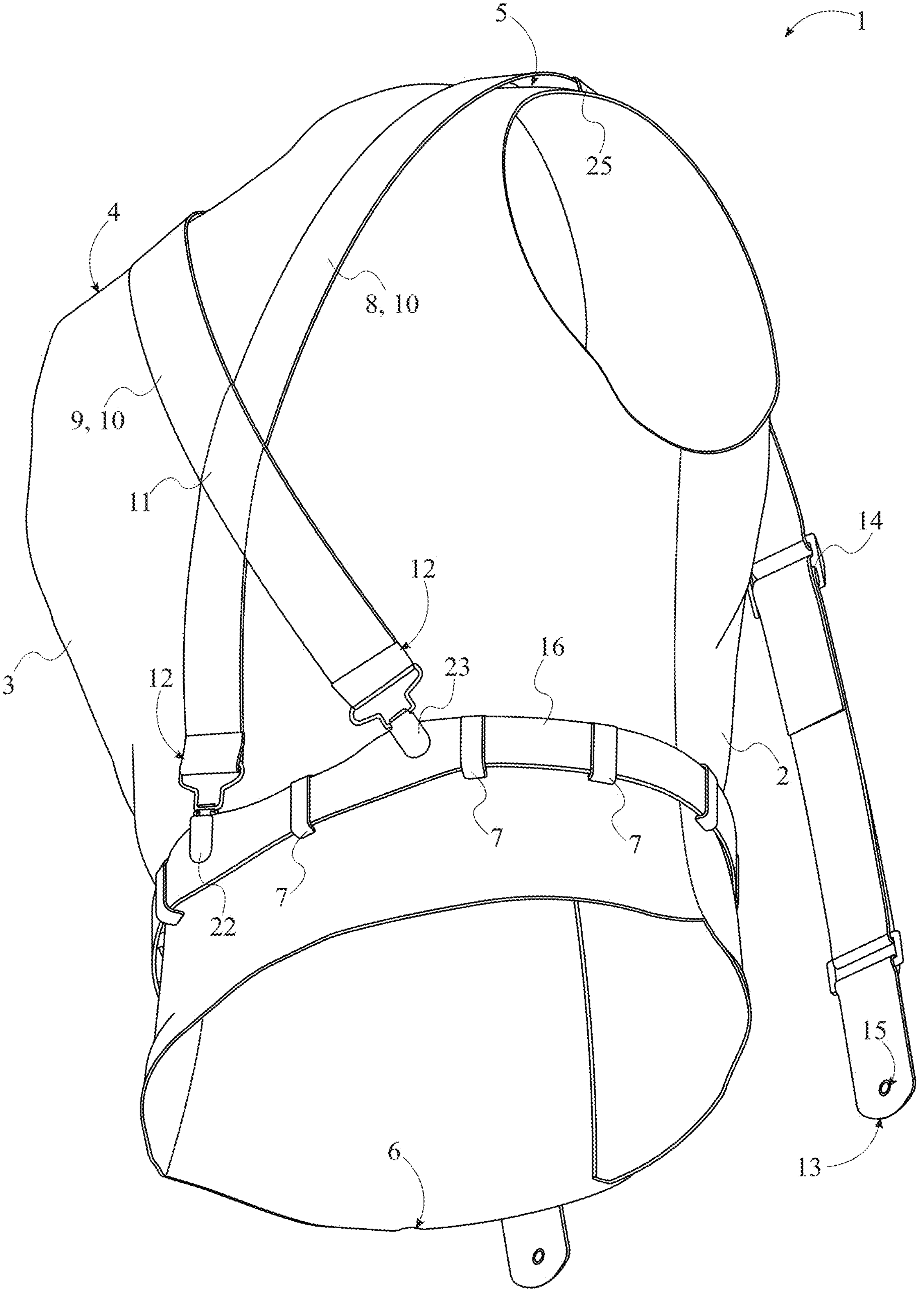
FIG. 4 is a bottom rear perspective view of the present invention.

All illustrations of the drawings are for the purpose of describing selected versions of the present invention and are not intended to limit the scope of the present invention.

The present invention discloses a support garment for a stringed musical instrument. The present invention is designed to provide more comfort to the user playing a musical instrument by better distributing the load of the musical instrument on the user's body. As can be seen in FIGS. 1 through 6, the present invention comprises an upper-body garment 1, a first support strap 8, a second support strap 9, and a waist belt 16. The upper-body garment 1 corresponds to the piece of clothing that is worn by the user while playing the musical instrument. The upper-body garment 1 also retains the first support strap 8 and the second support strap 9 in place to support the musical instrument in the desired position and/or orientation. Further, the first support strap 8 and the second support strap 9 allow for the removable attachment of the musical instrument to the present invention. The first support strap 8 and the second support strap 9 also support the musical instrument in such a way that the musical instrument is properly supported by the present invention without obstructing the user's movements while playing the musical instrument. The waist belt 16 further improves the distribution of the load from the musical instrument on the user's body by helping secure the first support strap 8 and the second support strap 9 to the upper body garment.

The general configuration of the aforementioned components allows the user to more comfortably play a stringed musical instrument for longer periods of time without long-term health complications. As can be seen in FIGS. 1 through 6, the upper-body garment 1 is a piece of clothing preferably designed to be worn on the upper body. For example, the upper-body garment 1 can be a tailored vest made of different custom materials and sizes to accommodate the user's body. However, different pieces of clothing that can be worn on the upper body may be implemented according to the user's preferences (e.g., a shirt, a jacket, etc.). In general, the upper-body garment 1 comprises a front side 2, a rear side 3, a left yoke section 4, a right yoke section 5, and a garment hem 6. The front side 2 and the rear side 3 correspond to the two largest surfaces of the upper-body garment 1. The left yoke section 4 and the right yoke section 5 correspond to the opposite sections of the yoke of the upper-body garment 1 that rest on the user's shoulders. The garment hem 6 corresponds to the hem portion of the upper-body garment 1. In other embodiments, additional components of custom pieces of clothing can be included in the present invention.

Moreover, the first support strap 8 and the second support strap 9 are preferably elongated pieces of material that comfortably rest on the user's body. As can be seen in FIGS. 1 through 6, the first support strap 8 and the second support strap 9 can be two guitar straps modified to be integrated into the present invention. Alternatively, custom made straps can be implemented for the present invention. In general, the first support strap 8 and the second support strap 9 each comprise a strap body 10, a crisscross area 11, a fixed strap end 12, and a free strap end 13. The strap body 10 corresponds to the elongated structures of each support strap. The fixed strap end 12 and the free strap end 13 correspond to the opposite ends of the strap body 10. The crisscross area 11 corresponds to the location on each strap body 10 where the first support strap 8 crosses the second support strap 9, or vice versa.

As can be seen in FIGS. 1 through 6, in the preferred embodiment, the present invention can be arranged as follows: the waist belt 16 is positioned offset to the left yoke section 4 and the right yoke section 5 so that the waist belt 16 can match the position of the user's waist on the upper-body garment 1. In addition, the waist belt 16 is mounted around the upper-body garment 1 to secure the waist belt 16 to the upper-body garment 1. The waist belt 16 can be secured to the upper-body garment 1 using snap fasteners positioned on the rear side 3. However, different fasteners can be utilized to secure the waist belt 16 to the upper-body garment 1. Further, the free strap end 13 of each support strap is positioned adjacent to the front side 2. The free strap end 13 preferably corresponds to the end of the strap body 10 that can be attached to the corresponding fastening mechanism of the musical instrument. On the other hand, the fixed strap end 12 and the crisscross area 11 of each support strap are positioned adjacent to the rear side 3. The fixed strap end 12 preferably corresponds to the end of the strap body 10 that can be attached to the waist belt 16. The crisscross area 11 is preferably positioned on the rear side 3 to not obstruct the attachment of the free strap end 13 to the musical instrument. In addition, the crisscross area 11 is positioned offset to the fixed strap end 12 so that the fixed strap end 12 can be easily attached to the waist belt 16.

Further, the strap body 10 of the first support strap 8 is attached about the left yoke section 4, while the strap body 10 of the second support strap 9 is attached about the right yoke section 5, as can be seen in FIGS. 1 through 6. This allows the formation of the crisscross area 11 of each support strap on the rear side 3. In addition, the crisscross area 11 of the first support strap 8 and the crisscross area 11 of the second support strap 9 being mounted to each other, offset to the waist belt 16, to secure the strap body 10 of the first support strap 8 to the strap body 10 of the second support strap 9. In some embodiments, the strap body 10 of the first support strap 8 to the strap body 10 of the second support strap 9 can be left unattached, which allows the user to replace a desired support strap if desired. Furthermore, the fixed strap end 12 of the first support strap 8 is attached onto the waist belt 16 to secure the first support strap 8 to the waist belt 16. Likewise, the fixed strap end 12 of the second support strap 9 is attached onto the waist belt 16 to secure the second support strap 9 to the waist belt 16. This way, the first support strap 8 rests on the user's left shoulder, with the free strap end 13 of the first support strap 8 resting on the front side 2 adjacent to the left side of the upper-body garment 1. The first support strap 8 then crosses the second support strap 9 at the crisscross area 11 on the rear side 3 before the fixed strap end 12 of the first support strap 8 is attached to the waist belt 16 adjacent to the right side of the upper-body garment 1. Similarly, the second support strap 9 rests on the user's right shoulder, with the free strap end 13 of the second support strap 9 resting on the front side 2 adjacent to the right side of the upper-body garment 1. The second support strap 9 then crosses the first support strap 8 at the crisscross area 11 on the rear side 3 before the fixed strap end 12 of the second support strap 9 is attached to the waist belt 16 adjacent to the left side of the upper-body garment 1. In alternative embodiments, different strap configurations can be implemented for the present invention.

As previously discussed, the first support strap 8 and the second support strap 9 are preferably designed to be length adjustable to enable the user to accommodate the position and/or orientation of the musical instrument. For example, by making a support strap shorter than the other, the tethered musical instrument can be tilted to match the user's preferred orientation of the musical instrument. As can be seen in FIGS. 1 through 6, the first support strap 8 and the second support strap 9 may each further comprise at least one loop-forming strap buckle 14 that allows the user to adjust the overall length of the strap body 10 of the corresponding support strap. To do so, the at least one loop-forming strap buckle 14 is slidably engaged along the strap body 10, adjacent to the free strap end 13, to allow the adjustment of the overall length of the strap body 10 of the corresponding support strap. For example, the at least one loop-forming strap buckle 14 allows the formation of a loop using a section of the corresponding strap body 10. By increasing the size of the loop, the overall length of the strap body 10 of the corresponding support strap is shortened. On the other hand, by decreasing the size of the loop, the overall length of the strap body 10 of the corresponding support strap is increased. In other embodiments, different length adjustment mechanisms can be integrated into the support straps.

In the preferred embodiment, the free strap end 13 of both the first support strap 8 and the second support strap 9 is designed to be attached to a portion of the musical instrument so that the musical instrument can be tethered to the present invention. For example, guitars in general include two strap buttons positioned opposite to each other across the guitar body from which guitar straps are terminally attached to. As can be seen in FIGS. 1 through 6, the first support strap 8 and the second support strap 9 may each further comprise at least one button-receiving hole 15 that engages with a strap button of the guitar. To do so, the at least one button-receiving hole 15 traverses through the strap body 10, adjacent to the free strap end 13, to form a hole large enough on the strap body 10 to engage the corresponding strap button of the guitar. Each button-receiving hole can be positioned at equal positions along the strap body 10 of the corresponding support strap so that the present invention can accommodate left-handed players as well as right-handed players. In alternate embodiments, different attachment mechanisms can be implemented to enable different stringed musical instruments to be tethered from the present invention.

As previously discussed, the waist belt 16 helps secure the first support strap 8 and the second support strap 9 to the upper-body garment 1. As can be seen in FIGS. 1 through 6, the waist belt 16 can be fastened to the rear side 3 using snap fasteners to keep the waist belt 16 in a fixed position on the upper-body garment 1. To provide additional support to the waist belt 16 around the upper-body garment 1, the upper-body garment 1 may further comprise a plurality of belt loops 7 that keeps the waist belt 16 in a fixed position on the upper-body garment 1. The plurality of belt loops 7 is distributed around the upper-body garment 1, offset to the left yoke section 4 and the right yoke section 5, so that the plurality of belt loops 7 provides support to the waist belt 16 around the upper-body garment 1. In addition, each of the plurality of belt loops 7 is externally connected to the upper-body garment 1 to secure each belt loop to the upper-body garment 1. Further, the waist belt 16 is slidably engaged through each of the plurality of belt loops 7 so that the waist belt 16 remains in a fixed position on the upper-body garment 1. In alternate embodiments, different fastening means can be implemented to secure the waist belt 16 to the upper-body garment 1.

Figure 5:
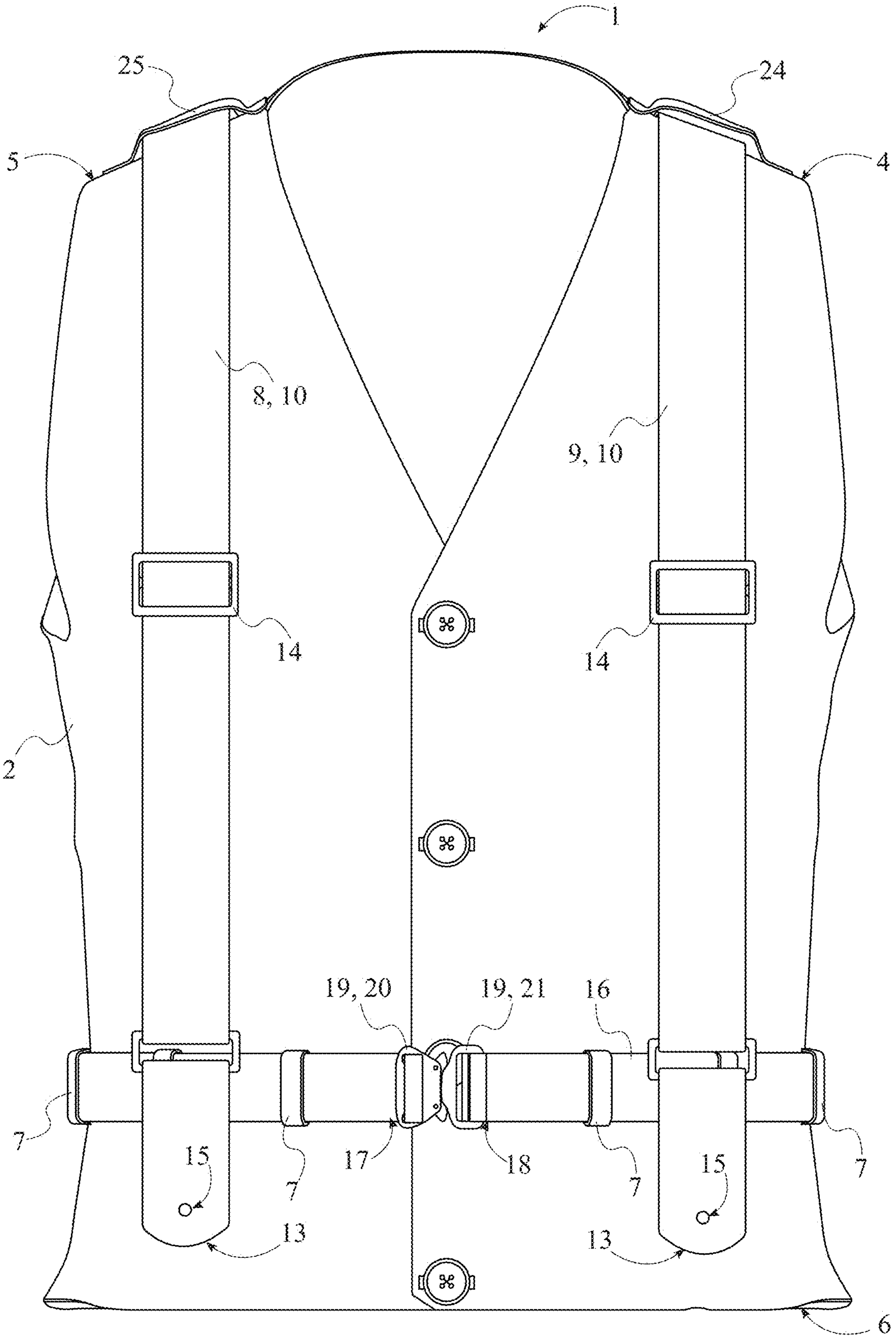
FIG. 5 is a front view of the present invention.
Figure 6:
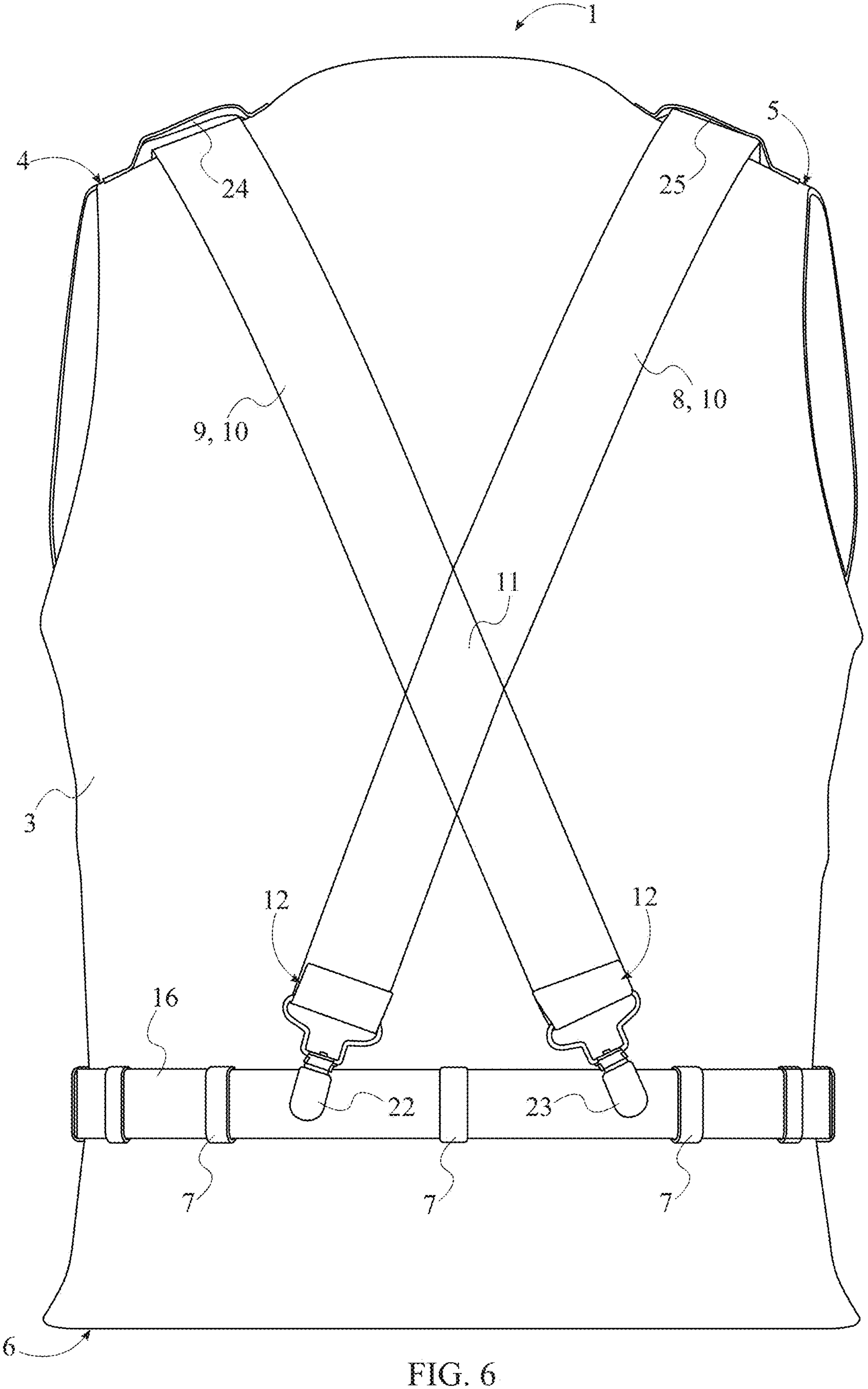
FIG. 6 is a rear view of the present invention.

Similar to the support straps, the waist belt 16 can also be provided as a length adjustable component to further accommodate the user's body. As can be seen in FIG. 5, the length-adjustable fastener 19 can be provided that allows the waist belt 16 to be fastened while also allowing the overall length of the waist belt 16 to be adjusted by the user. The length-adjustable fastener 19 comprises a first interlocking piece 20 and a second interlocking piece 21 corresponding to the interlocking components of the length-adjustable fastener 19. For example, the length-adjustable fastener 19 can be a side release buckle, the first interlocking piece 20 can be the male buckle member, and the second interlocking piece 21 can be the female buckle member. In addition, the waist belt 16 may comprise a first belt end 17 and a second belt end 18 corresponding to the terminal ends of the waist belt 16 that accommodate the first interlocking piece 20 and the second interlocking piece 21. To incorporate the length-adjustable fastener 19 into the waist belt 16, the first interlocking piece 20 is connected along the waist belt 16, adjacent to the first belt end 17, to secure the first interlocking piece 20 to the waist belt 16. Likewise, the second interlocking piece 21 is also connected along the waist belt 16, adjacent to the second belt end 18, to secure the second interlocking piece 21 to the waist belt 16. Further, the first interlocking piece 20 can be engaged with the second interlocking piece 21, adjacent to the front side 2, to tightly secure the waist belt 16 around the user's waist. In other embodiments, the length-adjustable fastener 19 can be replaced with other appropriate fasteners.

As previously discussed, the fixed strap end 12 of the first support strap 8 and the second support strap 9 are connected to the waist belt 16 to secure attachment of each support strap to the waist belt 16. In some embodiments, the connection of each fixed strap end 12 to the waist belt 16 can be a detachable connection. As can be seen in FIGS. 1 through 6, the present invention may further comprise a first strap clip 22 and a second strap clip 23 to enable the detachable connection of each fixed strap end 12 to the waist belt 16. The first strap clip 22 and the second strap clip 23 can be suspenders clips that allow each fixed strap end 12 to be removably attached to the waist belt 16 without damaging the waist belt 16. To do so, the fixed strap end 12 of the first support strap 8 is connected to the waist belt 16 by the first strap clip 22. Similarly, the fixed strap end 12 of the second support strap 9 is connected to the waist belt 16 by the second strap clip 23. This way, the user can detach each fixed strap end 12 from the waist belt 16 to remove the support straps from the upper-body garment 1. In other embodiments, the first strap clip 22 and the second strap clip 23 can be replaced with other fasteners.

Since the support straps rest on the shoulders, additional support can be provided to prevent the support straps from moving while the user is playing the musical instrument. As can be seen in FIGS. 1 through 6, a first shoulder strap 24 and a second shoulder strap 25 can be provided to help maintain the support straps on the shoulders. The first shoulder strap 24 and the second shoulder strap 25 can correspond to the shoulder straps of the upper-body garment 1 or can be custom straps integrated onto the upper-body garment 1. The first support strap 8 is attached onto the left yoke section 4 by the first shoulder strap 24 to secure the first support strap 8 with the first shoulder strap 24. In addition, the strap body 10 of the first support strap 8 is positioned between the first shoulder strap 24 and the left yoke section 4 so that the strap body 10 of the first support strap 8 can slide through the first shoulder strap 24. Similarly, the second support strap 9 is attached onto the right yoke section 5 by the second shoulder strap 25 to secure the second support strap 9 with the second shoulder strap 25. In addition, the strap body 10 of the second support strap 9 is positioned between the second shoulder strap 25 and the right yoke section 5 so that the strap body 10 of the second support strap 9 can also slide through the second shoulder strap 25. In other embodiments, different means can be implemented to keep the support straps in place on the user's shoulders.

Figure 7:
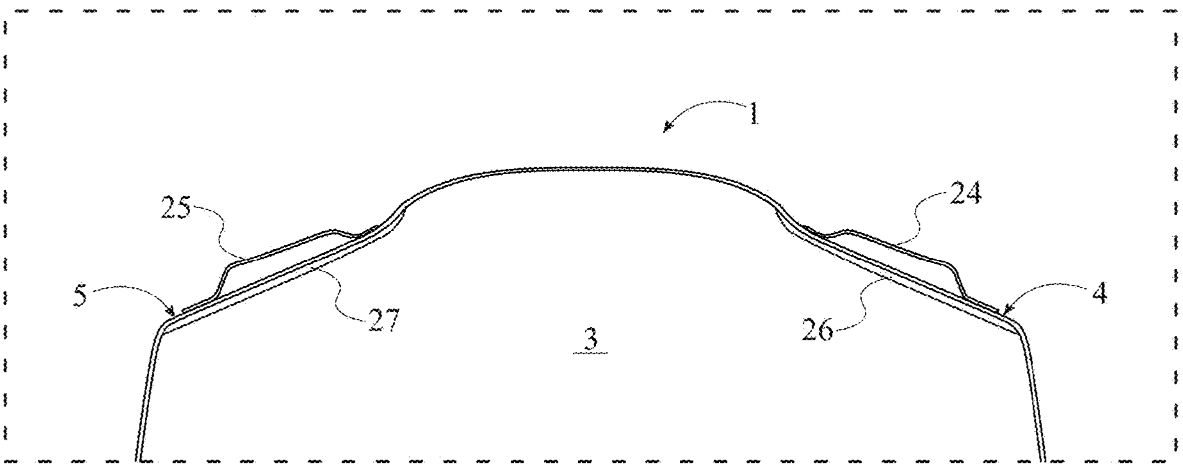
FIG. 7 is a schematic cross-sectional view of the yoke of the upper-body garment of the present invention.

To provide additional comfort to the user while wearing the present invention, padding can be incorporated into different sections of the upper-body garment 1 to relief the load from the musical instrument on the user's body. As can be seen in FIG. 7, the present invention may further comprise a left shoulder padding 26 and a right shoulder padding 27 to provide additional support and comfort on the user's shoulders. The left shoulder padding 26 is integrated into the upper-body garment 1, adjacent to the left yoke section 4, so that the left shoulder padding 26 surrounds the user's left shoulder. Similarly, the right shoulder padding 27 is also integrated into the upper-body garment 1, adjacent to the right yoke section 5, so that the right shoulder padding 27 surrounds the user's right shoulder. In other embodiments, additional padding can be provided on different sections of the upper-body garment 1.

Figure 8:
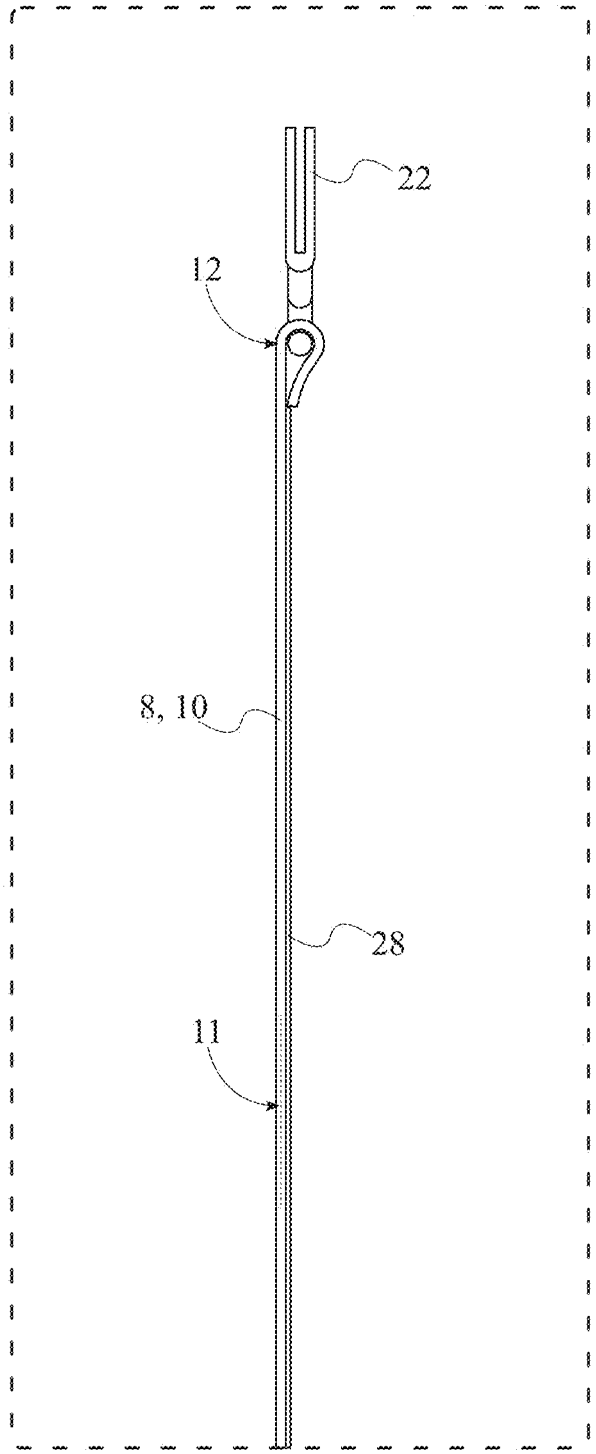
FIG. 8 is a schematic cross-sectional view of the fixed strap end of the first support strap of the present invention.
Figure 9:
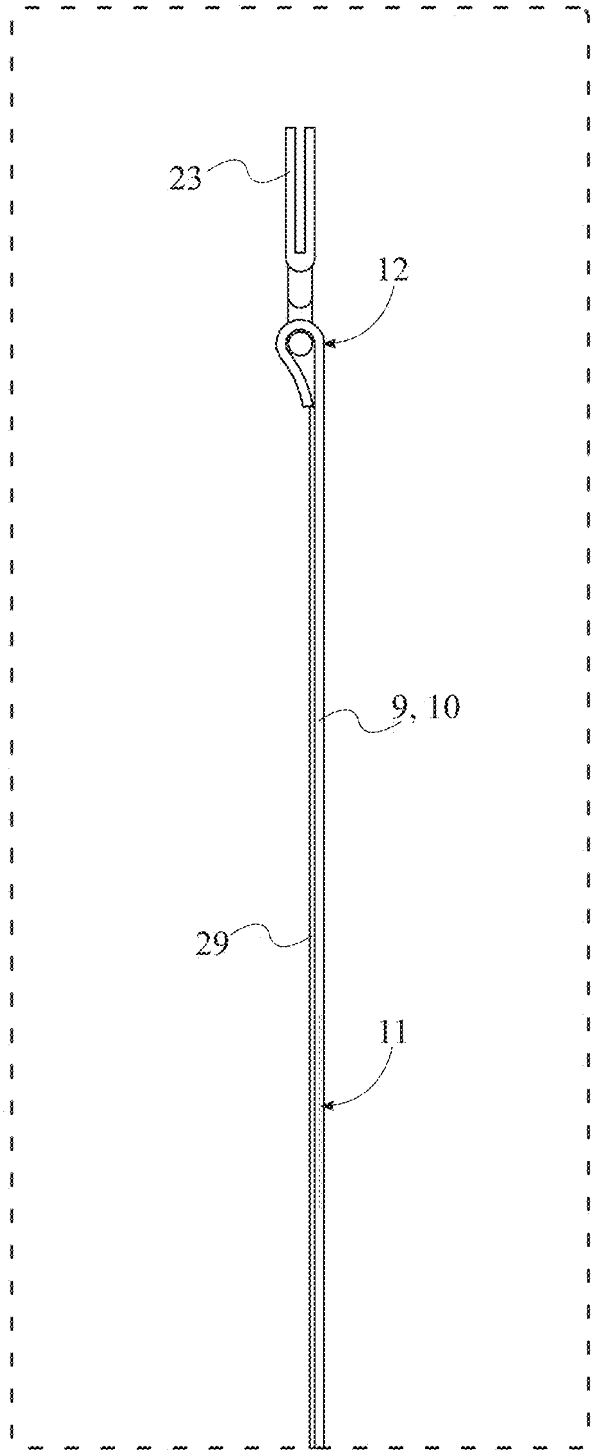
FIG. 9 is a schematic cross-sectional view of the fixed strap end of the second support strap of the present invention.

In some embodiments, additional padding on the support straps can be provided to make the present invention more comfortable to wear for prolonged periods of time. As can be seen in FIGS. 8 and 9, the present invention may further comprise a first strap padding 28 and a second strap padding 29. The first strap padding 28 and the second strap padding 29 reduce the friction of the support straps on the user's body so that the tension of the support straps from the musical instrument is lessened on the user's body. The first strap padding 28 is laterally connected along the first support strap 8 so that the first support strap 8 can comfortably rest on the user's body. Similarly, the second strap padding 29 is also laterally connected along the second support strap 9 so that second support strap 9 can also comfortably rest on the user's body. In alternate embodiments, the padding can be integrated into the support straps in different manners.

Although the invention has been explained in relation to its preferred embodiment, it is to be understood that many other possible modifications and variations can be made without departing from the spirit and scope of the invention.

What is claimed is:

1. A support garment for a stringed musical instrument comprising:

an upper-body garment;

a first support strap;

a second support strap;

a waist belt;

the upper-body garment comprising a front side, a rear side, a left yoke section, a right yoke section, a garment hem, and a plurality of belt loops;

the first support strap and the second support strap each comprising a strap body, a crisscross area, a fixed strap end, and a free strap end;

the waist belt being mounted around the upper-body garment;

the free strap end being positioned adjacent to the front side;

the fixed strap end and the crisscross area being positioned adjacent to the rear side;

the crisscross area being positioned offset to the fixed strap end;

the strap body of the first support strap being attached about the left yoke section;

the strap body of the second support strap being attached about the right yoke section;

the crisscross area of the first support strap and the crisscross area of the second support strap being mounted to each other, offset to the waist belt;

the fixed strap end of the first support strap being attached onto the waist belt;

the fixed strap end of the second support strap being attached onto the waist belt;

the plurality of belt loops being distributed around the upper-body garment, offset to the left yoke section and the right yoke section;

each of the plurality of belt loops being externally connected to the upper-body garment; and the waist belt being slidably engaged through each of the plurality of belt loops.

2. The support garment for a stringed musical instrument as claimed in claim 1 comprising:

the first support strap and the second support strap each further comprising at least one loop-forming strap buckle; and the at least one loop-forming strap buckle being slidably engaged along the strap body, adjacent to the free strap end.

3. The support garment for a stringed musical instrument as claimed in claim 1 comprising:

the first support strap and the second support strap each further comprising at least one button-receiving hole; and the at least one button-receiving hole traversing through the strap body, adjacent to the free strap end.

4. The support garment for a stringed musical instrument as claimed in claim 1 comprising:

a length-adjustable fastener;

the length-adjustable fastener comprising a first interlocking piece and a second interlocking piece;

the waist belt comprising a first belt end and a second belt end;

the first interlocking piece being connected along the waist belt, adjacent to the first belt end;

the second interlocking piece being connected along the waist belt, adjacent to the second belt end; and the first interlocking piece being engaged with the second interlocking piece, adjacent to the front side.

5. The support garment for a stringed musical instrument as claimed in claim 1 comprising:

a first strap clip;

a second strap clip;

the fixed strap end of the first support strap being connected to the waist belt by the first strap clip; and the fixed strap end of the second support strap being connected to the waist belt by the second strap clip.

6. The support garment for a stringed musical instrument as claimed in claim 1 comprising:

a first shoulder strap;

a second shoulder strap;

the first support strap being attached onto the left yoke section by the first shoulder strap;

the strap body of the first support strap being positioned between the first shoulder strap and the left yoke section;

the second support strap being attached onto the right yoke section by the second shoulder strap; and the strap body of the second support strap being positioned between the second shoulder strap and the right yoke section.

7. The support garment for a stringed musical instrument as claimed in claim 1 comprising:

a left shoulder padding;

a right shoulder padding;

the left shoulder padding being integrated into the upper-body garment, adjacent to the left yoke section; and the right shoulder padding being integrated into the upper-body garment, adjacent to the right yoke section.

8. The support garment for a stringed musical instrument as claimed in claim 1, wherein the upper-body garment is a vest.

9. The support garment for a stringed musical instrument as claimed in claim 1 comprising:

a first strap padding;

a second strap padding;

the first strap padding being laterally connected along the first support strap; and the second strap padding being laterally connected along the second support strap.

10. A support garment for a stringed musical instrument comprising:

an upper-body garment;

a first support strap;

a second support strap;

a waist belt;

the upper-body garment comprising a front side, a rear side, a left yoke section, a right yoke section, a garment hem, and a plurality of belt loops;

the first support strap and the second support strap each comprising a strap body, a crisscross area, a fixed strap end, a free strap end, at least one loop-forming strap buckle, and at least one button-receiving hole;

the upper-body garment being a vest;

the waist belt being mounted around the upper-body garment;

the free strap end being positioned adjacent to the front side;

the at least one loop-forming strap buckle being slidably engaged along the strap body, adjacent to the free strap end;

the fixed strap end and the crisscross area being positioned adjacent to the rear side;

the crisscross area being positioned offset to the fixed strap end;

the strap body of the first support strap being attached about the left yoke section;

the strap body of the second support strap being attached about the right yoke section;

the crisscross area of the first support strap and the crisscross area of the second support strap being mounted to each other, offset to the waist belt;

the fixed strap end of the first support strap being attached onto the waist belt;

the fixed strap end of the second support strap being attached onto the waist belt;

the at least one button-receiving hole traversing through the strap body, adjacent to the free strap end;

the plurality of belt loops being distributed around the upper-body garment, offset to the left yoke section and the right yoke section;

each of the plurality of belt loops being externally connected to the upper-body garment; and the waist belt being slidably engaged through each of the plurality of belt loops.

11. The support garment for a stringed musical instrument as claimed in claim 10 comprising:

a length-adjustable fastener;

the length-adjustable fastener comprising a first interlocking piece and a second interlocking piece;

the waist belt comprising a first belt end and a second belt end;

the first interlocking piece being connected along the waist belt, adjacent to the first belt end;

the second interlocking piece being connected along the waist belt, adjacent to the second belt end; and the first interlocking piece being engaged with the second interlocking piece, adjacent to the front side.

12. The support garment for a stringed musical instrument as claimed in claim 10 comprising:

a first strap clip;

a second strap clip;

the fixed strap end of the first support strap being connected to the waist belt by the first strap clip; and the fixed strap end of the second support strap being connected to the waist belt by the second strap clip.

13. The support garment for a stringed musical instrument as claimed in claim 10 comprising:

a first shoulder strap;

a second shoulder strap;

the first support strap being attached onto the left yoke section by the first shoulder strap;

the strap body of the first support strap being positioned between the first shoulder strap and the left yoke section;

the second support strap being attached onto the right yoke section by the second shoulder strap; and the strap body of the second support strap being positioned between the second shoulder strap and the right yoke section.

14. The support garment for a stringed musical instrument as claimed in claim 10 comprising:

a left shoulder padding;

a right shoulder padding;

a first strap padding;

a second strap padding;

the left shoulder padding being integrated into the upper-body garment, adjacent to the left yoke section;

the right shoulder padding being integrated into the upper-body garment, adjacent to the right yoke section;

the first strap padding being laterally connected along the first support strap; and the second strap padding being laterally connected along the second support strap.

15. A support garment for a stringed musical instrument comprising:

an upper-body garment;

a first support strap;

a second support strap;

a waist belt;

the upper-body garment comprising a front side, a rear side, a left yoke section, a right yoke section, a garment hem, and a plurality of belt loops;

the first support strap and the second support strap each comprising a strap body, a crisscross area, a fixed strap end, a free strap end, at least one loop-forming strap buckle, and at least one button-receiving hole;

the upper-body garment being a vest;

the waist belt being mounted around the upper-body garment;

the free strap end being positioned adjacent to the front side;

the at least one loop-forming strap buckle being slidably engaged along the strap body, adjacent to the free strap end;

the fixed strap end and the crisscross area being positioned adjacent to the rear side;

the crisscross area being positioned offset to the fixed strap end;

the strap body of the first support strap being attached about the left yoke section;

the strap body of the second support strap being attached about the right yoke section;

the crisscross area of the first support strap and the crisscross area of the second support strap being mounted to each other, offset to the waist belt;

the fixed strap end of the first support strap being attached onto the waist belt;

the fixed strap end of the second support strap being attached onto the waist belt;

the at least one button-receiving hole traversing through the strap body, adjacent to the free strap end;

the plurality of belt loops being distributed around the upper-body garment, offset to the left yoke section and the right yoke section;

each of the plurality of belt loops being externally connected to the upper-body garment; and the waist belt being slidably engaged through each of the plurality of belt loops.

16. The support garment for a stringed musical instrument as claimed in claim 15 comprising:

a length-adjustable fastener;

the length-adjustable fastener comprising a first interlocking piece and a second interlocking piece;

the waist belt comprising a first belt end and a second belt end;

the first interlocking piece being connected along the waist belt, adjacent to the first belt end;

the second interlocking piece being connected along the waist belt, adjacent to the second belt end; and the first interlocking piece being engaged with the second interlocking piece, adjacent to the front side.

17. The support garment for a stringed musical instrument as claimed in claim 15 comprising:

a first strap clip;

a second strap clip;

a first shoulder strap;

a second shoulder strap;

the fixed strap end of the first support strap being connected to the waist belt by the first strap clip;

the fixed strap end of the second support strap being connected to the waist belt by the second strap clip;

the first support strap being attached onto the left yoke section by the first shoulder strap;

the strap body of the first support strap being positioned between the first shoulder strap and the left yoke section;

the second support strap being attached onto the right yoke section by the second shoulder strap; and the strap body of the second support strap being positioned between the second shoulder strap and the right yoke section.

18. The support garment for a stringed musical instrument as claimed in claim 15 comprising:

a left shoulder padding;

a right shoulder padding;

a first strap padding;

a second strap padding;

the left shoulder padding being integrated into the upper-body garment, adjacent to the left yoke section;

the right shoulder padding being integrated into the upper-body garment, adjacent to the right yoke section;

the first strap padding being laterally connected along the first support strap; and the second strap padding being laterally connected along the second support strap.

* * * * *